T. VARNEY.
CATENARY STRUCTURE.
APPLICATION FILED JULY 17, 1914.
1,157,463.
Patented Oct. 19, 1915.
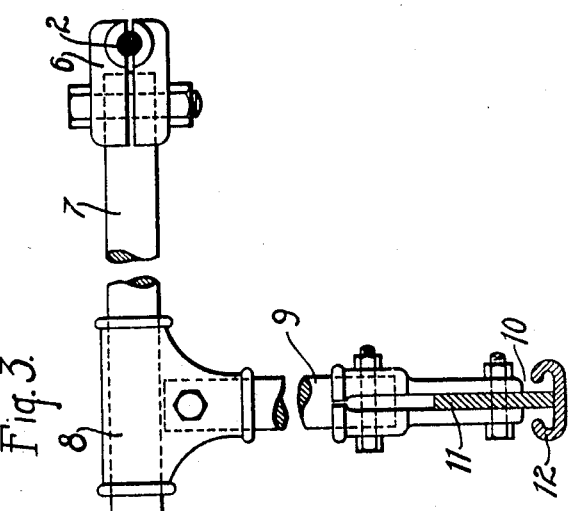
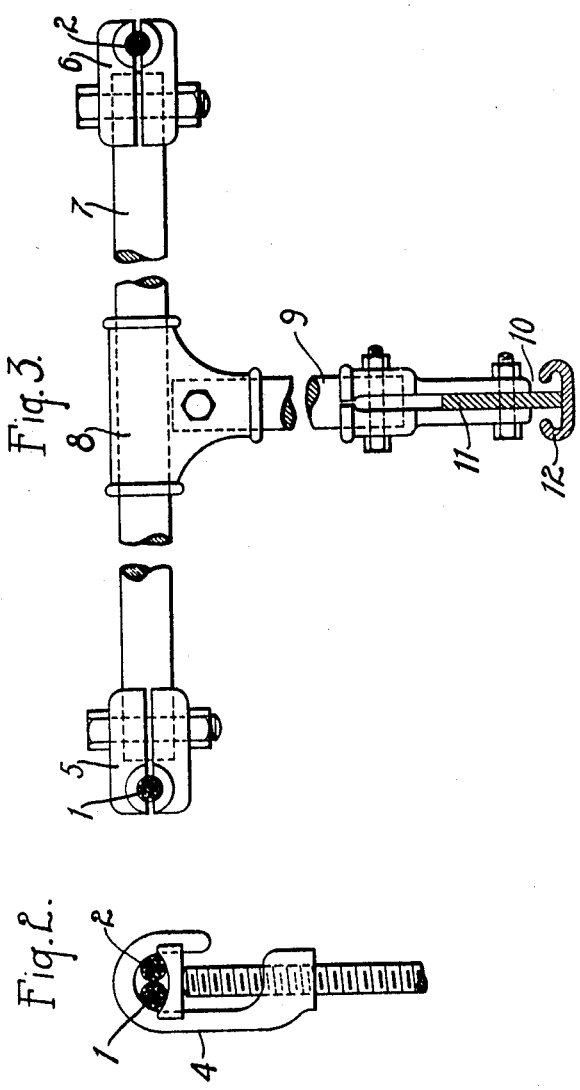
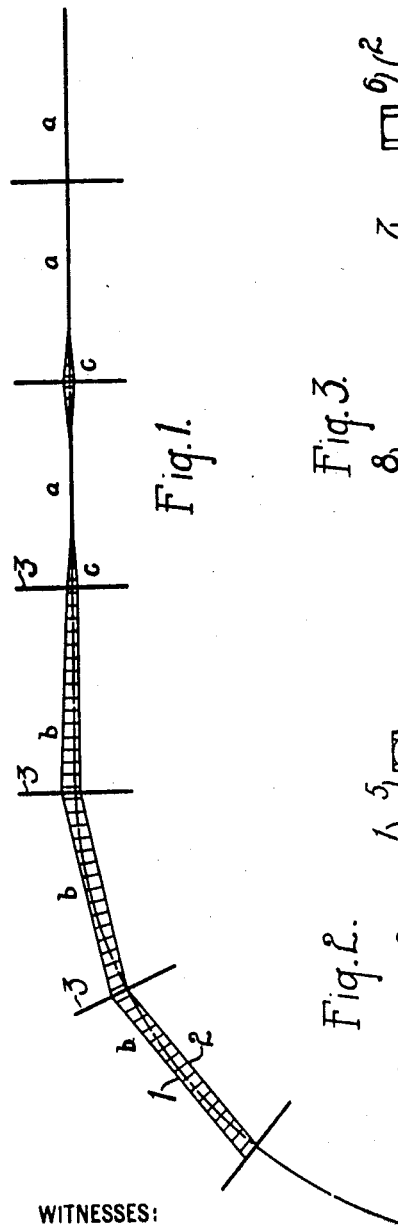
WITNESSES:
R. J. Fitzgerald
Clarence E. Myers
INVENTOR
Theodore Varney.
BY
Wesley G. Carr
ATTORNEY

UNITED STATES PATENT OFFICE.

THEODORE VARNEY, OF PITTSBURGH, PENNSYLVANIA.

CATENARY STRUCTURE.

1,157,463.  Specification of Letters Patent.  Patented Oct. 19, 1915.

Application filed July 17, 1914. Serial No. 851,460.

*To all whom it may concern:*

Be it known that I, THEODORE VARNEY, a citizen of the United States, and a resident of Pittsburgh, in the county of Allegheny and State of Pennsylvania, have invented a new and useful Improvement in Catenary Structures, of which the following is a specification.

My invention relates to overhead structures for electric railways and particularly to structures of the so-called catenary type.

One object of my invention is to secure the strength, bracing effect and other advantages of a catenary structure having two messenger cables wherever needed.

Another object of my invention is to provide a double catenary structure that will permit of ready lateral adjustment of the trolley conductor to accommodate it to track curves and other service conditions.

A further object of my invention is to provide a double catenary structure that shall avoid the obstructions to the view that are presented by the wellknown type that embodies triangular hangers for the trolley conductors.

In the equipment of railways for electrical operation, if heavy locomotives, cars or trains are to be operated at high speeds, it is usual to supply the electrical energy to the current collectors by means of either third rails located alongside the tracks or by means of catenary overhead structures that embody either one or two messenger cables suspended in catenary curves and a trolley conductor suspended therefrom by means of hangers.

The so-called double catenary structure, as heretofore employed, has the requisite amount of strength and resistance to wind and pressure of the current collectors but it is expensive and obstructs the view of the engineer or motorman to an objectionable degree.

My invention possesses the advantages and avoids the objectionable characteristics above set forth.

In the accompanying drawing, Figure 1 is a diagrammatic view of a portion of a curve and a tangent equipped in accordance with my invention. Fig. 2 is a view, in elevation, of a portion of a trolley wire hanger for two juxtaposed messenger cables, the latter being shown in section, and Fig. 3 is a view, partially in elevation and partially in section, of a messenger cable and trolley conductor structure for use with spread-apart messenger cables.

As indicated in Fig. 1, two messenger cables 1 and 2 are supported side-by-side, at suitable intervals of two hundred and fifty or three hundred feet, by structures 3 that may be of usual or any suitable type.

Along tangent portions of the track the messenger cables 1 and 2 may be located in contact with each other and be gripped by single hanger clamps 4, as indicated in Fig. 2, this arrangement being indicated at $a$ in Fig. 1.

When greater resistance to side pressure of wind or current collector is necessary or lateral adjustment of the trolley conductor is desired, the structure shown in Fig. 3 may be employed. In this structure, the messenger cables 1 and 2 are spaced apart to the desired degree and their clamps 5 and 6 are connected by a horizontal rod or tube 7, galvanized gas pipe being suitable for this purpose.

Adjustably mounted on the member 7 is a member 8 from which is suspended a hanger rod 9 to the lower end of which a trolley conductor 10 is suitably clamped.

As here shown, the trolley conductor comprises conductor strips 11 and contact pieces or shoes 12 disposed along their bottom edges, but any other form of trolley conductor may be employed, if desired.

Not only may the curved portions of the road be equipped with the devices shown in Fig. 3, as indicated at $b$ in Fig. 1, but the portions at and adjacent to the supports 3, and elsewhere, may be so equipped, if desired. Such portions are indicated at $c$ in Fig. 1.

It will be understood from the foregoing description and the drawing that each of the two messenger cables need be only one half the size that would be required if a single cable were employed, and that they may be utilized either in close side-by-side relation or spread apart to any desired extent in accordance with the side stresses to which the structure is to be subjected and the lateral adjustability of the trolley conductor that may be necessary or desirable.

Variations in form, dimensions and materials may, of course, be made within the scope of my invention and the appended claims.

I claim as my invention:

1. A double catenary structure for an electric railway comprising two messenger cables disposed in close side-by-side relation in certain places and in spaced-apart relation in certain other places, and single hanger rods for the trolley conductor in both relations.

2. A double catenary structure for an electric railway comprising two side-by-side messenger cables disposed in contact relation in certain places and in spread apart relation in other places, single clamps and single hanger rods for the cables in contact relation, and separate clamps and single hanger rods for the cables in the spread-apart relation.

3. A double catenary structure for an electric railway comprising two side-by-side messenger cables disposed in juxtaposition along certain sections of the track and spaced apart along other sections of the track, single-clamp hangers for the juxtaposed sections, separate clamps and horizontal connecting members for the spaced-apart sections, and single hanger rods adjustably mounted on said connecting members.

4. A double catenary structure for an electric railway comprising two side-by-side messenger cables adapted for use in juxtaposed or in spread-apart relation and single vertical hangers for suspending a trolley conductor therefrom in each relation.

5. A double catenary structure comprising two side-by-side messenger cables, clamps therefor, rigid horizontal members interposed between corresponding clamps, and substantially vertical trolley wire hangers adjustably suspended from said horizontal members.

6. A double catenary structure comprising two side-by-side messenger cables, means for clamping said cables in any desired spaced relation, and substantially vertical hangers for a trolley wire.

7. A double catenary structure comprising two side-by-side messenger cables, means for connecting said cables in juxtaposition or in spaced-apart relation and a single vertical trolley-wire hanger rod depending from each of said connecting means.

In testimony whereof, I have hereunto subscribed my name this 10th day of July 1914.

THEODORE VARNEY.

Witnesses:
M. S. THOMPSON,
EMMA UHLINGER.